United States Patent
Tuyls et al.

(10) Patent No.: US 7,555,646 B2
(45) Date of Patent: Jun. 30, 2009

(54) EFFICIENT IMPLEMENTATION OF ZERO KNOWLEDGE PROTOCOLS

(75) Inventors: Pim T. Tuyls, Mol (BE); Bruce Murray, Eastleigh (GB)

(73) Assignee: NXP B.V., Eindhoven (NL)

( * ) Notice: Subject to any disclaimer, the term of this patent is extended or adjusted under 35 U.S.C. 154(b) by 698 days.

(21) Appl. No.: 10/538,449

(22) PCT Filed: Nov. 21, 2003

(86) PCT No.: PCT/IB03/05335

§ 371 (c)(1),
(2), (4) Date: Jun. 10, 2005

(87) PCT Pub. No.: WO2004/054168

PCT Pub. Date: Jun. 24, 2004

(65) Prior Publication Data

US 2006/0112273 A1    May 25, 2006

(30) Foreign Application Priority Data

Dec. 10, 2002    (GB) ............................ 0228760.5

(51) Int. Cl.
*H04L 9/00* (2006.01)

(52) U.S. Cl. .................. 713/168; 713/169; 713/170; 713/171; 713/182; 380/28; 380/30

(58) Field of Classification Search ................. 713/168, 713/182; 380/30
See application file for complete search history.

(56) References Cited

U.S. PATENT DOCUMENTS

| 5,987,138 | A  | * | 11/1999 | Gilbert et al. ................. 380/30 |
| 7,165,181 | B2 | * | 1/2007  | Brickell ...................... 713/182 |
| 2006/0174126 | A1 | * | 8/2006 | Crandall et al. ............. 713/176 |
| 2008/0130870 | A1 | * | 6/2008 | Boscher et al. ............... 380/28 |

FOREIGN PATENT DOCUMENTS

| EP | 578059 A1   | * | 1/1994  |
| EP | 0 578 059 A1 |  | 12/1994 |

OTHER PUBLICATIONS

International Search Report for International Application No. PCT/IB 03/05335, Dated Mar. 10, 2004.

* cited by examiner

*Primary Examiner*—Ayaz R Sheikh
*Assistant Examiner*—Sarah Su

(57) ABSTRACT

An efficient implementation of zero knowledge protocols for authentication of devices and for identification of devices connecting to a network. According to one aspect, the present invention provides a method of verifying the knowledge of a secret number s in a prover device by a verifier device having no knowledge of the secret number, with a zero-knowledge protocol using the Montgomery representation of numbers and Montgomery multiplication operations therein.

7 Claims, 3 Drawing Sheets

EFFICIENT IMPLEMENTATION OF ZERO KNOWLEDGE PROTOCOLS

BACKGROUND

The present invention relates to zero knowledge protocols that allow the knowledge of some "secret" or private key information in a first party domain to be verified by a second party without imparting the actual secret information or private key to that second party or to any eavesdropping third party. In particular, the invention has application in the implementation of zero knowledge protocols in systems and devices that have restricted computational resource such as smart cards, mobile electronic devices and the like.

Throughout the present specification, the first party owning the secret information or private key ("s") and wishing to prove that it has possession of the information will be referred to as the "prover" ("P"); the second party wishing to verify that this is the case without actually receiving knowledge of the secret will be referred to as the "verifier" ("V"). The prover P and verifier V may be any suitable electronic device. The secret information may be any numeric value, hereinafter referred to as the secret number of the prover P.

Zero knowledge protocols are very valuable tools that can be used for authentication of devices such as smart cards used in financial transactions, or in pay television access, and for identification of devices connecting to a network, such as mobile telephones and other electronic devices.

Conventionally, the prover will offer a computationally difficult mathematical problem, and the verifier will ask for one of the two or more possible solutions to the problem. If the prover knows critical information relating to the solution, it is able to provide either (or any) of the requested available solutions on demand, according to the request of the verifier. If the prover does not know the critical information, it is computationally infeasible for it to always be able to provide the requested solution to the verifier.

Usually, zero knowledge protocols rely on some hard mathematical problems such as the factorisation of integers or the discrete logarithm problem. A drawback to these protocols is that they usually require extensive use of modular arithmetic which require greater computational resource than is desirable for lower power, limited capacity devices such as smart cards and portable electronic devices. Thus, a typical implementation time for the security protocols is greater than desirable.

SUMMARY

It is an object of the present invention to provide a more efficient method of implementing zero knowledge protocols in processor devices, and especially in devices that have low computational resource or low power.

According to one aspect, the present invention provides a method of verifying the knowledge of a secret number s in a prover device by a verifier device having no knowledge of the secret number, with a zero-knowledge protocol using the Montgomery representation of numbers and Montgomery multiplication operations therein.

According to another aspect, the present invention provides a prover device having contained therein a secret number s in Montgomery representation, the device adapted for proving the knowledge of the secret number s to a verifier device without conveying knowledge of the secret number itself, with a zero-knowledge protocol using the Montgomery representation of numbers and Montgomery multiplication operations therein.

According to another aspect, the present invention provides a verifier device for verifying the knowledge of a secret number s in a prover device without knowledge of the secret number itself, with a zero-knowledge protocol using the Montgomery representation of numbers and Montgomery multiplication operations therein.

According to another aspect, the present invention provides a method of proving the knowledge of a secret number s in a prover device to a verifier device having no knowledge of the secret number, with a zero-knowledge protocol using the Montgomery representation of numbers and Montgomery multiplication operations therein, comprising the steps of:

selecting a random number, r,
computing the Montgomery $e^{th}$ power of r to obtain x,
transmitting x to a verifier device;
receiving a challenge value, c;
computing the Montgomery product of $y=r \, x_m \, s^c$; and
transmitting y to the verifier device.

According to another aspect, the present invention provides a method of verifying the knowledge of a secret number s in a prover device by a verifier device having no knowledge of the secret number, with a zero-knowledge protocol using the Montgomery representation of numbers and Montgomery multiplication operations therein, comprising the steps of:

receiving the Montgomery square v of the secret number s;
receiving the Montgomery square, x of a random number, r;
transmitting a challenge value, e to the prover device;
checking the authenticity of the prover's response, y according to the Montgomery square of y verified against values of x and/or v received from the prover device according to the challenge value e.

According to another aspect, the present invention provides a method of verifying the knowledge of a secret number s in a prover device by a verifier device having no knowledge of the secret number, with a zero-knowledge protocol using the Montgomery representation of numbers and Montgomery multiplication operations therein, comprising the steps of:

receiving the Montgomery $e^{th}$ power of the secret number s;
receiving the Montgomery $e^{th}$ power, x of a random number, r;
transmitting a challenge value, c to the prover device;
checking the authenticity of the prover's response, y according to the Montgomery $e^{th}$ power of y verified against the value of $x \, x_m \, s^{ec}$ received from the prover device according to the challenge value c.

BRIEF DESCRIPTION OF THE DRAWINGS

Embodiments of the present invention will now be described by way of example and with reference to the accompanying drawings in which.

DETAILED DESCRIPTION OF EXEMPLARY EMBODIMENTS

Figure 1:
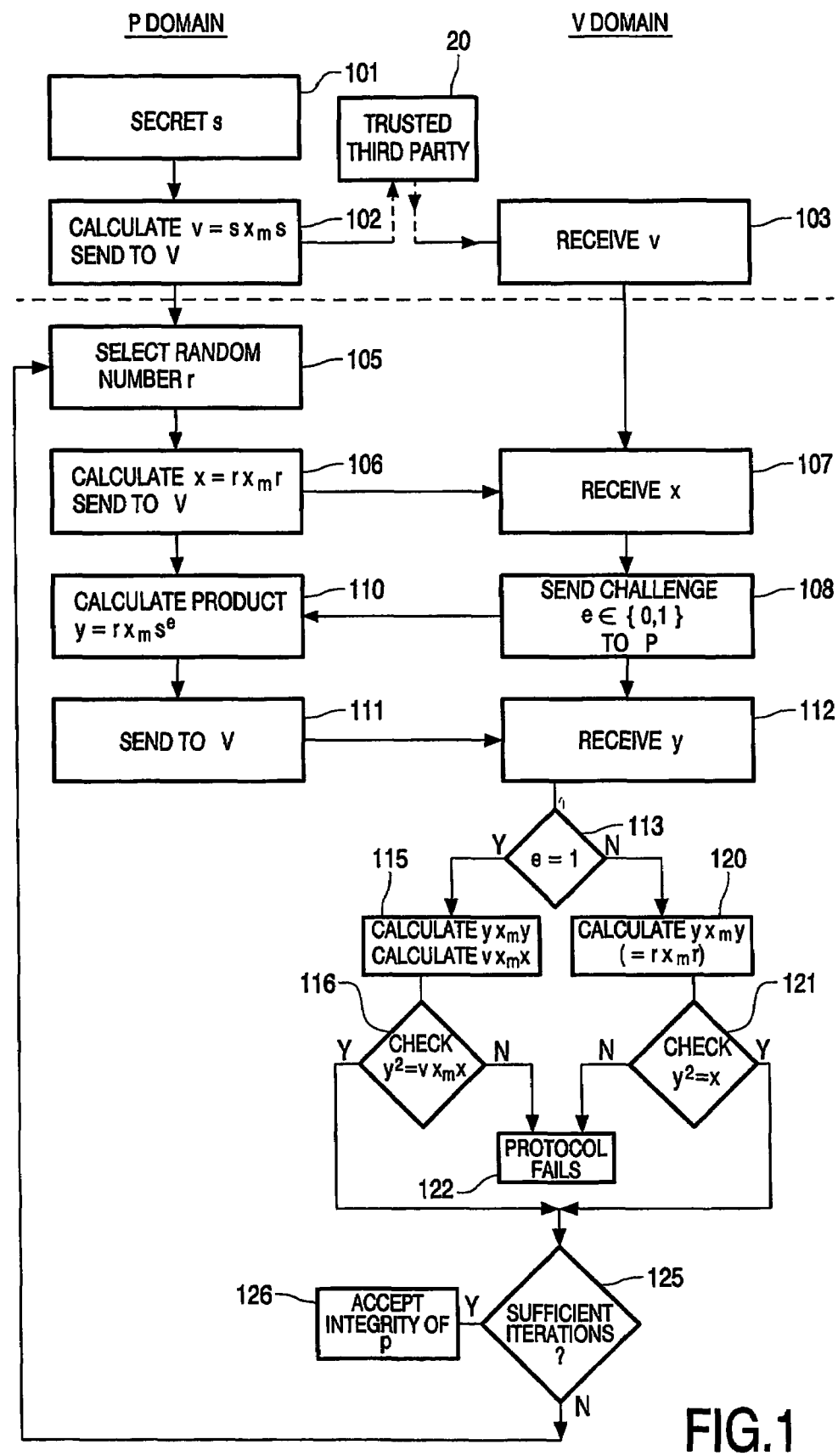
FIG. 1 shows a schematic flow diagram of a protocol according to the present invention.

In a preferred example, the invention offers an improvement over the existing basic Fiat-Shamir protocol.

The purpose of the Fiat-Shamir protocol is for the prover P to convince the verifier V that he knows a secret s (a number), but without revealing that secret to V, or indeed to anyone else who may eavesdrop on the protocol.

To be effective, the protocol is conventionally conducted over a reasonably large number of rounds (or "trials"). Each round gives V an increasing degree of confidence that P does in fact know the number s.

The number s remains private within the domain of the prover. In the first instance, the prover P provides the square of the number s modulo n to a trusted third party, $v=s^2$ mod n. For example, v may be a public key for prover P, and the private key s is then the smallest case for which s=sqrt(v) mod n. The trusted third party is also generally assumed to be the creator of the modulus n from its constituent prime factors.

The trusted third party provides v to the verifier V. Since n is a product of at least two large primes unknown to V (typically a 1024 or 2048 bit number), it is extremely difficult to factorise, and this in turn makes it computationally infeasible to derive s given $s^2$; thus the trusted third party can give V the value of $s^2$ without revealing s.

Each round of the Fiat-Shamir protocol works in three stages.

Stage 1

The prover P chooses a random number r mod n, and commits to it by calculating $r^2$ mod n and transmitting this to the verifier V. Note that the verifier V cannot compute r for the same reason as before—taking square roots modulo a large composite number of unknown factorisation is computationally infeasible.

Stage 2

The verifier V now chooses one of two questions to ask prover P. The prover does not know in advance which of these two questions he is going to be asked, but he will only be able to answer both of them correctly if he genuinely knows the secret s. The verifier V can ask either for the value of the product r·s mod n, or for the value of r that the prover has just chosen.

This is generally performed by V sending a bit e to P indicating his choice of question, referred to as the "challenge" or "examination", such that the prover has to provide the answer, $y=r \cdot s^e$ mod n, where e is in $\{0,1\}$.

Stage 3

The prover P provides $y=r \cdot s^e$ mod n as requested and the verifier checks the result as follows.

If the challenge was for e=1, the verifier expects to have received r·s mod n. The verifier cannot deduce any information about s from this, because r is a random number not known to V). Therefore, the verifier checks that the response squared (i.e. $y^2$ mod n, which should be $(rs)^2$ mod n) is the same as $r^2 * s^2$ mod n. The verifier received $r^2$ from P in Stage 1 of this round, and gets $s^2$ (=v) from the trusted third party.

If the challenge was for e=0, the verifier expects to have received r, and checks that its square matches the value t mod n provided in Stage 1.

The point of challenge e=0 becomes clear when consideration is given to how an impersonator of P might behave, without having knowledge of s. An impersonator who does not know s can fake (by pre-calculation) a correct answer to the e=1 challenge, but this proves to be a gamble since he does not know in advance what question he will be asked. He could do this by:

selecting any random r, getting v from the trusted third party, and then sending $(r^2*v^{-1})$ mod n to V during Stage 1 if he is challenged e=1 by V at Stage 2, then he responds with r as his value of y in Stage 3 this looks acceptable to V, which will check that $y^2=r^2=(r^2*v^{-1})*v$.

However, the impersonator will not, in this instance, be able to answer challenge e=0 correctly, since he would need to present a square root of $(r^2*v^{-1})$ mod n, which in turn would require him to know a square root of $v^{-1}$ mod n. Equivalently, he needs to know a square root of v mod n i.e. he needs to know s to answer e=0 correctly.

On the other hand, the impersonator could gamble on being challenged e=0. This just involves him selecting a random r, presenting $r^2$ in Stage 1 and presenting r in Stage 3 in response to challenge e=0, which again looks acceptable to V. But had he chosen this approach, he is unable to provide r·s mod n through lack of knowledge of s, if the challenge is e=1 in Stage 2.

The complete protocol requires execution of a sufficient number of rounds to satisfy V that it is in fact conversing with P, and not an impersonator, given that the impersonator has a 50:50 chance of selecting the correct strategy in each round. If the protocol requires 20 rounds, i.e. 20 sequential correct responses to the challenge $e=\{0,1\}$, the odds of an impersonator that does not know s successfully proving to V is less than 1 in 1,000,000. For 40 rounds, that probability decreases to less than 1 in $10^{12}$.

Each round requires the use of a new value of r. The protocol also requires that the response to a challenge be provided within a time limit determined by it being computationally infeasible that an impersonator can compute the answer to the challenge other than the straightforward multiplication $r \cdot s^e$ mod n anticipated.

It is clearly of benefit to ensure that all of the computation operations during execution of the protocol are easily performed by low power devices with restricted computational power, so that multiple successive rounds can be carried out quickly.

According to the present invention, it has been recognised that zero knowledge protocols such as the Fiat-Shamir protocol discussed above can be implemented entirely using Montgomery representations of the numeric quantities used in the protocols. This offers significant improvements in computational efficiency for both the prover and verifier.

The solution proposed is based on the Montgomery representation of a number $z \in Z_n$. The Montgomery representation $z_m$ of the number z is given by $z_m=zR$ mod n, where the number R is much larger than n, both R and n being known to the prover device and to the verifier device.

Montgomery multiplication is performed as follows. For two numbers $a_m$ and $b_m$ being the Montgomery representation of the numbers a and b, the modular multiplication is given by:

$$a_m \times_m b_m = a_m b_m R^{-1} \bmod n.$$

As in the conventional Fiat-Shamir protocol, n is a publicly known modulus that is a product of two prime numbers p and q which remain secret in the domain of a trusted third party.

With reference to FIG. 1, in this scheme, the secret s (step 101) can be regarded as the Montgomery representation of another number, s'. A trusted third party may store the Montgomery representation of $s'^2$, ie. $s^2$ where the squaring is performed according to the Montgomery multiplication $s^2=s \times_m s$, which we refer to hereinafter as v. This may be regarded as the public key for the prover, P. In general, the Montgomery product $s^2$ is calculated (step 102) and provided to the verifier domain (step 103) whether this is by way of a trusted third party 20 or otherwise directly from the prover. In this way, the integrity of the value v may be assured.

These steps 101 to 103 may be regarded as an initial set up procedure which is executed once for many iterations or uses of the three stage protocol now to be described.

Stage 1

In the first stage of the modified protocol, P chooses a random number r∈$Z_n$ (step 105) which can be interpreted as the Montgomery representation of another number, r'. P performs a Montgomery multiplication of r with itself (step 106), yielding $r^2$ (hereinafter referred to as x), which is the Montgomery representation of $r'^2$, and sends x ($=r^2$) to the verifier (step 107).

Stage 2

In the second stage of the modified protocol, the verifier V sends a challenge e∈{0, 1} to the prover P (step 108).

Stage 3

In the third stage of the modified protocol, P computes the Montgomery multiplication of r and $s^e$, ie. r $x_m$ $s^e$, hereinafter referred to as y (step 110), and sends this number to the verifier, V (step 111). On receiving y (step 112), V then performs one of the following two checks depending upon the challenge value of e (step 113).

In the case of e=1, V calculates the value for y $x_m$ y, and the value for v $x_m$ x (step 115), and checks (step 116) whether the two calculated values are equal, ie. whether $y^2$=(v $x_m$ x). This requires two Montgomery multiplications instead of two ordinary modular multiplications.

In the alternate case of e=0, the verifier V calculates $y^2$=y $x_m$ y (step 120) which is equivalent to r $x_m$ r, because the term se evaluates to unity). V then checks (step 121) whether $y^2$ (the Montgomery square of the number y that was sent in steps 111, 112) equals the number x ($=r^2$) that had been sent before in steps 106, 107. This requires only one Montgomery multiplication instead of one ordinary modular multiplication.

If either of the checks of steps 116 or 121 fails, that constitutes a failure of the protocol (step 122) and the verifier will conclude that prover P has failed to establish its knowledge of the secret s.

If either of the checks of steps 116 or 121 evaluates as true, a decision is then made in step 125 as to whether further iterations of the protocol are required to satisfy the integrity of P, ie. to assure V that P has possession of the secret s (step 126).

If further iterations are required, the protocol is repeated from step 105 with a new random value, r.

As a consequence of the modified protocol, both P and V have only to perform Montgomery multiplications (in steps 106, 110, and in steps 115, 120 respectively) which are more efficient than ordinary multiplications mod n (as in the conventional Fiat-Shamir scheme).

No numbers need be converted into Montgomery representation or the reverse during execution of the protocol, because the starting numbers, s, v, r are already in Montgomery representation. This makes the modified protocol even more efficient.

It will be understood that the protocol requires that it must be computationally infeasible for an impersonator prover, P' to compute either a square root of ($r^2$ $x_m$ $v^{-1}$) or the square root of v, depending upon whether an impersonator P elects to gamble on a challenge e of either 1 or 0, and certainly computationally infeasible within a timeframe that would normally be accepted by V between transmission step 106 and receiving step 112.

Figure 2:
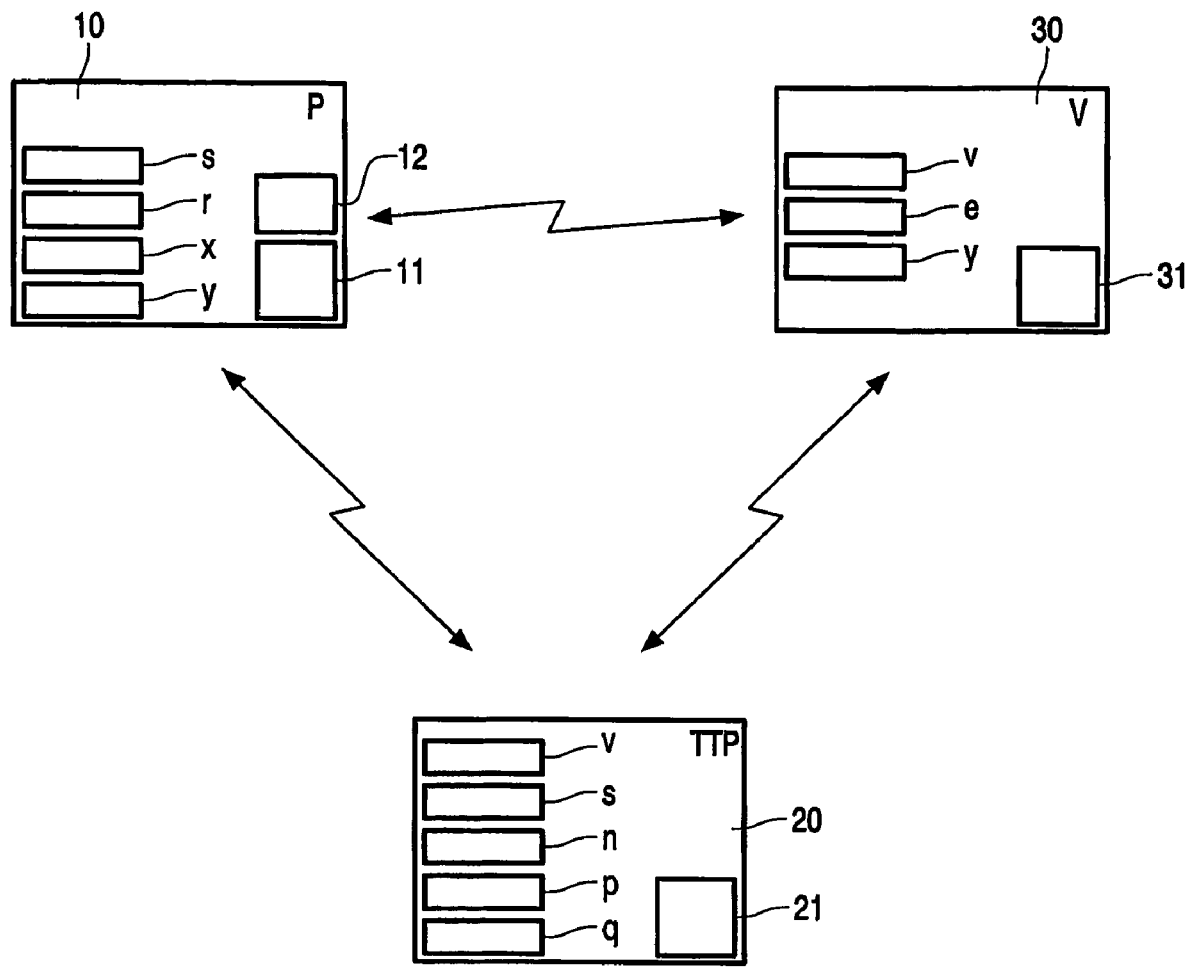
FIG. 2 shows a block diagram of apparatus suitable for implementing the protocol of FIG. 1.

The protocol described above may be implemented in any suitable hardware or software. A preferred implementation is shown in FIG. 2.

A prover device 10 may comprise a smart card or similar low power device, such as a pay-TV card, a credit card or a SIM card for a mobile telephone. The device 10 may comprise the smart card itself, or the card together with the device into which it is inserted. For example, where the card is "read" (or interrogated) by a verifying device, the card itself may be provided with a limited processing capability in the form of processor 11. Where the card is plugged into or used within a suitable device (such as a satellite TV receiver or mobile telephone) which can also be considered as forming part of the domain of P, then the processing capability 11 may reside in the device which receives the card.

The verifier device 30 may be a card reader (for direct interrogation of, for example a credit card) or may be a remote device that interrogates a device into which the card is installed. For example, the verifier device 30 may be a satellite TV transmitter that interrogates a set top box into which an authorisation card is inserted. Alternatively, the verifier device 30 could be a mobile telephony base station that communicates with a mobile telephone and its SIM card.

In preferred arrangements, prover device 10 includes memory registers for s, r, x and y held in Montgomery representation, and a random number generator 12.

In preferred arrangements, verifier device 30 includes a processor 31 and registers for v and y in Montgomery representation; and a random number generator for e.

In preferred arrangements, a trusted third party device 20 includes a processor 21 and maintains a register for v in Montgomery representation. The third party device may also be the provider of v and s as the public/private key pair for prover 10, and provide the value of n derived from secret prime numbers p and q.

It will be understood that the expression "random" when used in connection with the generation of random number r and random value of e from the set {0, 1} implies merely that the value of r or e selected by the sending party must be sufficiently unpredictable in the receiving party domain that no useful pattern of values for prediction of or inference about the next value to be issued can be determined by the receiving party.

Each of the devices 10, 20, 30 may be in communication with one another using any suitable connection by which data transfer may be made. This includes wireless links using any suitable medium such as radio, microwave, optical, infrared, sonic and the like. The connections may be by way of direct electrical connections, transient or permanent, or via a switching or packet based network.

As discussed earlier, it has been determined that the Fiat-Shamir protocol can be modified to operate with Montgomery representations of numbers and Montgomery arithmetic. The principle is also found to extend to other protocols based on an RSA-like structure. A further example is now given in which the Guillou-Quisquater protocol is adapted to use Montgomery representations of numbers.

The Guillou-Quisquater protocol is an extension of the Fiat-Shamir protocol making use of higher powers. It allows a reduction in both the number of messages and memory requirements for establishing a prover's knowledge of a secret number, s.

In the Guillou-Quisquater protocol, a trusted third party chooses two RSA primes p and q and computes the product n=pq. The trusted third party defines a public exponent e≧3 with gcd(e, φ(n))=1 and computes its private exponent d=$e^{-1}$ mod φ(n). The system parameters (e, n) are made public.

Figure 3:
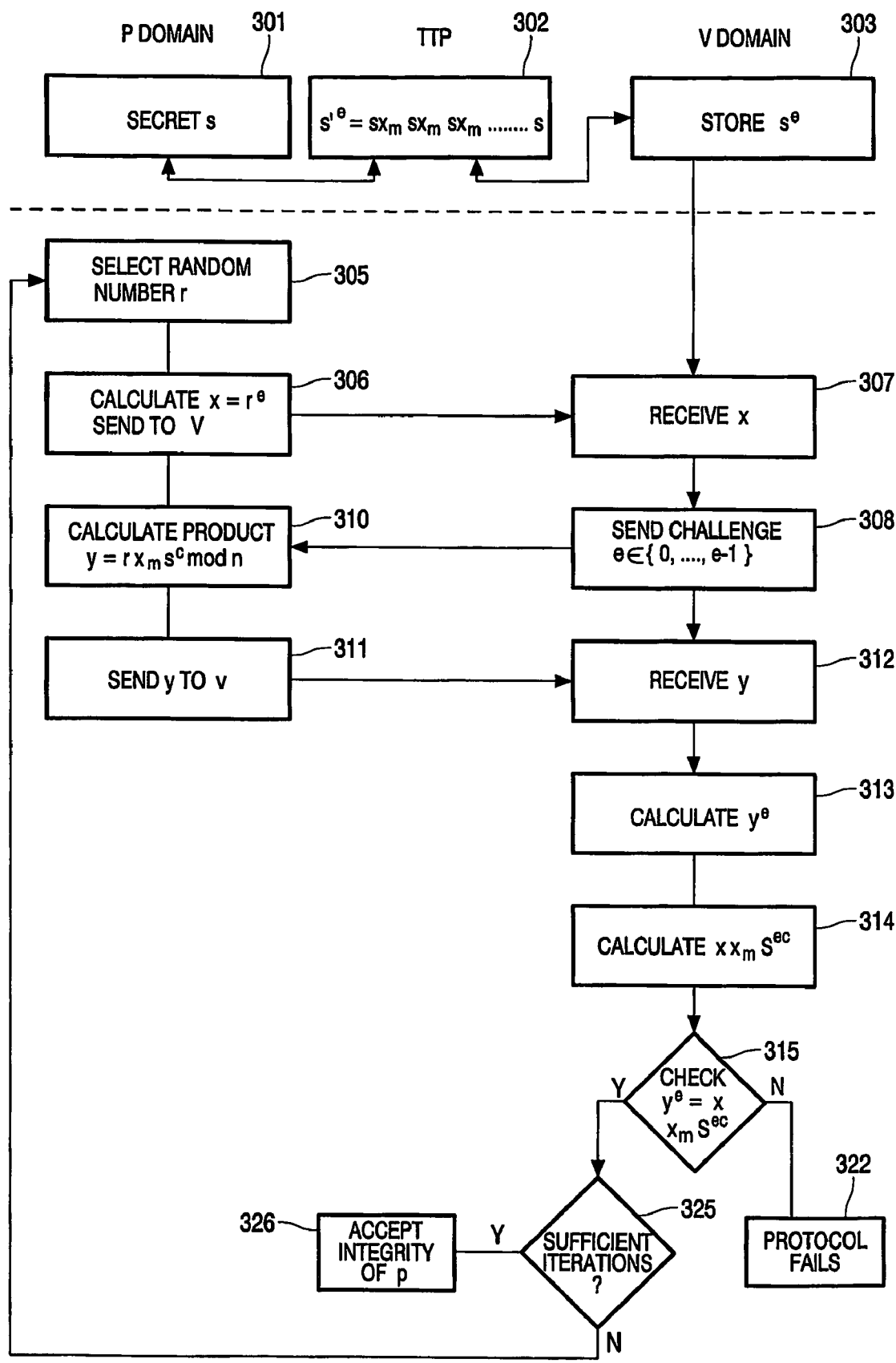
FIG. 3 shows a schematic flow diagram of an alternative protocol according to the present invention.

With reference to FIG. 3, in the modified protocol according to the present invention, all the numbers are given in Montgomery representation and all computations are done using Montgomery arithmetic. The secret of the prover P is set ∈$Z_n$ (step 310) and may be considered as the Montgomery representation of another number s'. The trusted third party TTP then computes and stores (step 302) the Montgomery representation of $s'^e$, i.e., $s \times_m s \times_m s \ldots \times_m s$ (e times). The verifier V receives and stores se (step 303) from the trusted third party.

The protocol proceeds as follows:

P chooses a number $r \in Z_n$ at random (step 305). r can be considered as the Montgomery representation of another number r'. P then computes the Montgomery $e^{th}$ power of r: $x = r^e$ (ie. $r \times_m r \times_m r \ldots \times_m r$ (e times)) and sends x to the verifier V (step 306). Note that x is the Montgomery representation of $r'^e$.

V receives x (step 307) and chooses a challenge value $c \in \{0, 1, \ldots, e-1\}$ at random, which V sends to P (step 308).

In response to the challenge c, P computes $y = r \times_m s^c \bmod n$ (step 310) and sends y to V (step 311).

On receipt of y (step 312), V calculates the Montgomery power $y^e$ (step 313) and the Montgomery power $s^{ec}$ (step 314) and checks to see if $y^e = x \times_m s^{ec}$ (step 315). If it does not, the protocol fails (step 322) and V must conclude that P does not know s.

If the check proves that $y^e = x \times_m s^{ec}$, then V checks to see whether sufficient iterations of the protocol have been carried out to verify that V knows s to a sufficient degree of certainty (step 325). If yes, the process terminates (step 326), and if not, the protocol is repeated with the selection of a new random number r by P (step 305). It is a general goal of the Guillou-Quisquater protocol that you need perform fewer rounds than in the Fiat-Shamir protocol in order to achieve a comparable degree of certainty.

Other embodiments are intentionally within the scope of the accompanying claims.

The invention claimed is:

1. A method of verifying knowledge of a secret number s in a prover device by a verifier device having no knowledge of the secret number, the method comprising a zero-knowledge protocol using a Montgomery representation of numbers and Montgomery multiplication operations therein, wherein the zero knowledge protocol comprises the Fiat-Shamir protocol, the method further comprising:

(i) providing to the verifier device a value $v = s^2$ being the Montgomery multiplication of the secret number s by itself;

(ii) computing, by the prover device, a value $x = r \times_m r$, where r is a random number, and transmitting the value x to the verifier device;

(iii) selecting, by the verifier device, a challenge value of e from a set [0, 1] and transmitting the challenge value to the prover device;

(iv) computing, by the prover device, a value $y = r \times_m s^e$, and transmitting the value y to the verifier device; and (v) the verifier device checking an authenticity of the prover's response according to the values x, y and v previously received and according to the challenge value e.

2. The method of claim 1 wherein the step of checking the authenticity of the prover's response comprises the steps of:

for a challenge value of e=1, computing the values of $y \times_m y$ and $v \times_m x$ and checking that they are the same; or for a challenge value of e=0, computing the value of $y \times_m y$ and checking that it is the same as the previously received value of x.

3. The method of claim 1 further including the steps of repeating steps (ii) to (v) for a number of consecutive rounds to confirm the authenticity of the prover's response.

4. The method of claim 1 in which the secret number s is a Montgomery representation of another number s' known in the prover device domain but not in the verifier device domain, further including the step of computing, by the prover device, the value of s from s' according to $s = s'R \bmod n$, where R>n, values of n and R being used by both the prover device and the verifier device.

5. The method of claim 1 in which the Montgomery multiplications of $s \times_m s$, $r \times_m r$, and $r \times_m s^e$ are carried out according to the formula $a \times_m b = abR^{-1} \bmod n$, where R>n, values of n and R being used by both the prover device and the verifier device.

6. The method of claim 2 in which the Montgomery multiplications of $y \times_m y$ and $s^2 \times_m x$ are carried out according to the formula $a \times_m b = abR^{-1} \bmod n$, where R>n, values of n and R being used by both the prover device and the verifier device.

7. The method of claim 1 in which all computation in the zero knowledge protocol are performed using Montgomery representation of numbers and using Montgomery multiplication operations.

* * * * *